July 28, 1931. G. G. BROCKWAY 1,815,890
GLASS MELTING PREHEATER AND MIXER
Filed Jan. 4, 1929
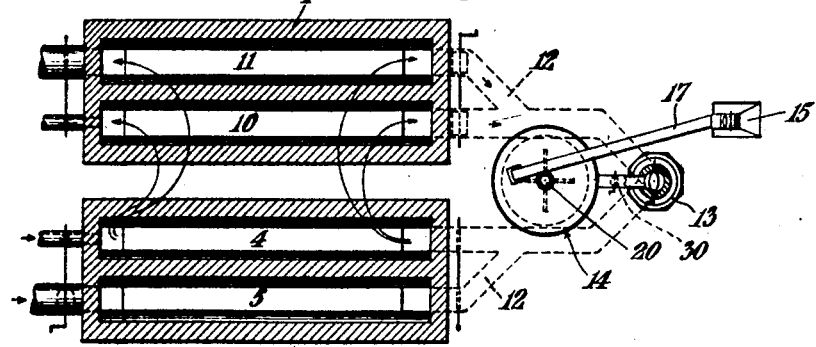
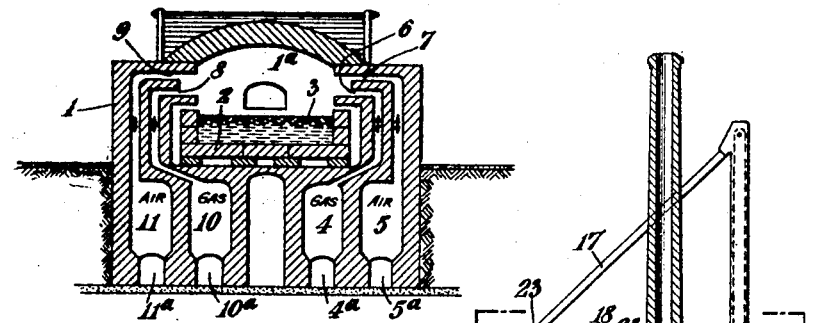
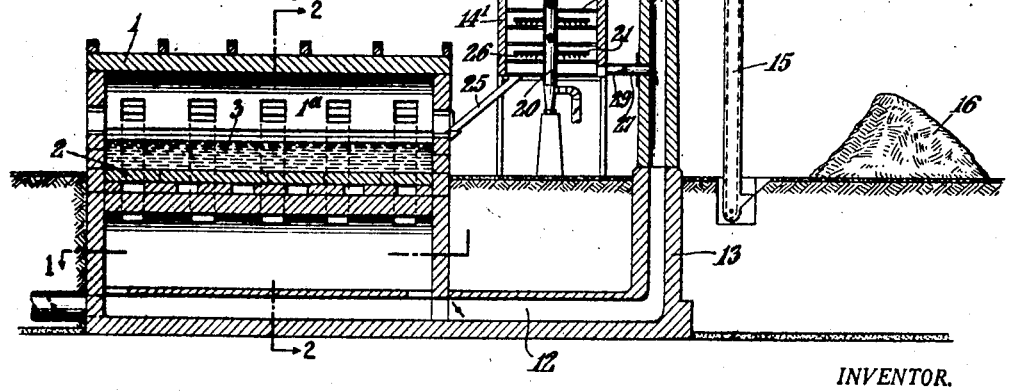
INVENTOR.
George Glen Brockway.
BY Ward & Crosby
his ATTORNEYS.

Patented July 28, 1931

1,815,890

UNITED STATES PATENT OFFICE

GEORGE GLEN BROCKWAY, OF WARREN, PENNSYLVANIA, ASSIGNOR TO NICHOLS COPPER COMPANY, OF NEW YORK, N. Y., A CORPORATION OF NEW YORK

GLASS MELTING-PREHEATER AND MIXER

Application filed January 4, 1929. Serial No. 330,328.

The invention relates to glass manufacture, and particularly to improvements in glass melting apparatus. An object of the invention is to increase the efficiency and output of glass melting installations. Another object is the provision of means whereby a glass melting furnace may be operated continuously and uniformly at full capacity, if desired. These objects are accomplished by the provision of means for thoroughly mixing and heating the glass-forming ingredients before the same are supplied to the melting furnace, and preferably utilizing the heat of the waste gases from the melting furnace in such preheating of the glass mixture; and further, if desired, in causing continuous passage of the glass mixture through the preheater, and thence to the melting furnace.

The invention consists in improved process and steps of processes, and means for accomplishing the above objects, and in the provision of an improved arrangement of apparatus for preheating the glass mixture and for utilizing waste gases from glass melting furnaces, all as will be more fully set forth in the following specification and be particularly pointed out in the appended claims. Other objects of the invention consist in the provision of improved combinations of parts and details of construction, as will appear more fully hereinafter.

It will be noted that the provision of the preheater for the glass mixture enables the utilization, for heating the same, of the heat in the waste gases from the melting furnace which otherwise would go to waste up the stack. Also, that the provision of the preheater, continuously delivering glass mixture at a proper predetermined temperature, to a furnace such as formerly used with a batch process for melting glass, permits more uniform operation of the furnace, with a large increase in efficiency of operation and in the daily output of the furnace.

In order that the invention may be more clearly understood, attention is directed to the accompanying drawings, forming part of this application, and illustrating one embodiment of the invention.

In the drawings, Fig. 1 represents a horizontal sectional view taken substantially on line 1—1 of Fig. 3;

Fig. 2 is a vertical sectional view taken substantially on line 2—2 of Fig. 3; and Fig. 3 is a vertical sectional view through a regenerative furnace for melting glass, and through the preheater and stack arranged according to one example of this invention.

Referring to the drawings, I have illustrated at 1 a glass melting furnace of the regenerative furnace type, having a bed 2 of fire-brick, whereon the melt 3 of glass-forming material, is placed. Gas and air are mixed and burned above the material 3 and the resulting heat melts the mixture, which may be worked from one end. The regenerative or heat-accumulating chambers or passages are located beneath the furnace chamber proper, 1a, as shown.

The gas and air may pass through the regenerative passages 4, 5, below the bed 2 and through ports 6, 7, respectively, into the furnace chamber, 1a, where they burn to melt the glass forming mixture. The waste gases may then escape through ports 8, 9, and regenerative passages 10, 11, to flue connections 10a, 11a, whence they find their way, by a flue, 12, to a stack 13. After a period of operation in this manner the travel of the incoming gas and air is switched, by suitable dampers, so that they enter chamber 1a by passages 10, 11 respectively, the waste gases going off by passages 4, 5 and flue passages 4a, 5a to the flue 12 and stack 13. By the alternate use of the regenerative passages for incoming fuel and outgoing hot gases the incoming fuel is preheated by the bricks of the regenerative passages which have been heated by the escaping flue gases which previously passed therethrough. All of the above is well known construction and is merely given by way of example.

A preheater furnace 14 is shown as mounted adjacent to the stack 13. The glass forming mixture is delivered to the top of the preheater by any suitable means, as by a continuously acting elevator 15, which may be any endless chain or belt arrangement of standard construction, taking the glass forming mixture from a pile 16, for example, and delivering it to a chute, 17, through which it runs into the preheater. The glass forming mixture may comprise the usual or any desired materials employed for the melt.

The preheater comprises as shown, a cylindrical casing 14′, with a top cover plate 18, through a suitable opening in which the glass forming mixture is delivered by chute 17. Between the cover plate and the bottom of the preheater there are a number of superposed floors or hearths. The number of hearths and the size of the apparatus will, of course, depend upon the size of the glass melting furnace, or furnaces, with which it is used, and the conditions of use.

A vertical shaft, indicated at 20, extends vertically and axially through the preheater, and carries rabble arms 21 which extend horizontally above each hearth 19 and are provided with suitable rabble teeth 26. Shaft 20 may be rotated in any well known manner, to operate the rabble arms.

The hearths 19 are provided with openings therethrough, which may be alternately, in successive floors, at the center, that is, surrounding the shaft 20, and at the periphery, as indicated at 23, 24. The revolving rabble arms, of any desired number above each hearth, are arranged to advance the glass forming mixture over the hearths or floors, slowly, and through the openings, 23, 24, onto the lower floors, so that the mixture will gradually and continuously pass through the preheater from top to bottom, it being thus delivered, uniformly heated and well mixed, from the bottom compartment to the bed of the glass melting furnace as, by means of a chute, 25. The glass mixture may be thus advanced alternately inwardly and outwardly over the hearths 19, so as ultimately to drop through the inner and outer openings 23, 24 in the manner well known with heaters or furnaces of this type.

The preheater is preferably heated by the hot waste gas in stack 13, some of which may be by-passed through the preheater. As shown, this hot gas may enter the bottom compartment of the preheater through a flue 27, the gas then passing successively over the various hearths of the preheater, and escaping from the top compartment by a flue 28, back to the stack. Flues 27 and 28 may be provided with dampers as at 29 and 30, so that the flow of the hot gas through the preheater may be accurately regulated. It will be obvious that the gas, passing in countercurrent to the descending glass forming mixture, moves upwardly through the inner and outer openings, 23, 24 alternately, and comes into close contact with the mixture in the preheater. Furthermore, the hottest gas thus acts upon the hottest portion of the glass forming mixture in the lower compartments, adding an increment to its heat before it passes to the melting furnace.

It will be clear that the preheating of the glass mixture will shorten considerably the time required for the material to remain in the melting furnace, and that a proper proportioning and thorough mixing of the ingredients will enable uniform operation to be practiced when the temperature conditions and the flow of gases and material in the apparatus are properly adjusted. Such uniform operation permits the maintenance of substantially constant conditions within the furnace, thereby greatly increasing the furnace efficiency and improving the quality of the product. The temperature of the waste gases entering the stack will vary with conditions but may be, for example, about 900° F. or above. Obviously, additional heating means for the preheater may be provided, if desired. Also, obviously, the invention is not limited to the coaction of one melting furnace with one preheater, served with hot gas from one stack, since, if desired, one preheater may serve a number of melting furnaces, or a number of preheaters may be associated with one stack taking waste gas from a number of melting furnaces, or the like, and also if desired, the waste gases or a part thereof may pass through the preheater before reaching the stack.

While I have described my invention in detail and with respect to a certain embodiment thereof, I do not desire to be limited to such details or forms, since many changes and modifications may be made and the invention may be embodied in other forms without departing from the spirit and scope of the invention in its broader aspects. Hence I desire to cover all modifications and forms coming within the language or scope of any one or more of the appended claims.

What I claim as new and desire to secure by Letters Patent is:

1. In glass manufacture, the combination of a glass melting furnace, a preheater for the glass forming mixture, said preheater including a plurality of superposed hearths, means for causing said mixture to travel through said preheater in one direction, means for causing hot waste gases from said furnace to travel through said preheater and over said hearths in the opposite direction, to preheat the mixture, and means for delivering such preheated mixture from said preheater to said furnace.

2. In glass manufacture, the combination of a glass melting furnace, a device for concurrently mixing and preheating the glass forming mixture, and means for directing hot waste gases from said furnace into said preheating device and into contact with said mixture to heat the same during the mixing thereof.

3. In glass manufacture, the combination of a glass melting furnace, a stack, connections for carrying hot waste gases from said furnace to said stack, a preheater for the glass forming mixture, and means for by-passing a part of the hot gases from said stack through said preheater.

4. In glass manufacture, the combination of a furnace for melting glass, a stack, connections for carrying hot waste gases from said furnace to said stack, a preheater for the glass forming mixture, means for causing said mixture to travel through said preheater from top to bottom, and valved connections for by-passing hot gases from said stack into the lower part of said preheater and from the top thereof back into said stack.

5. The process of melting a glass forming mixture which comprises gradually heating and concurrently, thoroughly and substantially uniformly mixing the ingredients in a preheating furnace and continuously feeding the mixture at a temperature approaching its sintering temperature into a melting furnace.

6. In glass manufacture, the combination of a glass melting furnace, a stack for hot waste gases therefrom, a preheater for the glass forming mixture adjacent said stack at an elevation higher than the furnace, rabbling means in said preheater for mixing said mixture, means for diverting hot gases from said stack into said preheater and over said mixture during the rabbling thereof, and gravity means for conveying said mixture from said preheater to said furnace.

In testimony whereof I have signed my name to this specification.

GEORGE GLEN BROCKWAY.